United States Patent [19]

Braun et al.

[11] Patent Number: 5,281,455
[45] Date of Patent: * Jan. 25, 1994

[54] LAMINATE ARTICLE COMPRISING MOISTURE-CURABLE SILICONE PRESSURE SENSITIVE ADHESIVE AND RELEASE LINER

[75] Inventors: Joseph T. Braun, Midland; Virgil J. Johnson, Bay City; Shawn K. Mealey, Midland, all of Mich.

[73] Assignee: Dow Corning Corporation, Midland, Mich.

[*] Notice: The portion of the term of this patent subsequent to May 4, 2010 has been disclaimed.

[21] Appl. No.: 748,581

[22] Filed: Aug. 22, 1991

[51] Int. Cl.$^5$ .................. A61F 13/02; B32B 7/12; C08F 283/00
[52] U.S. Cl. ......................... 428/40; 428/354; 428/355; 525/474; 525/477
[58] Field of Search ............ 505/477, 474; 428/354, 428/355, 40

[56] References Cited

U.S. PATENT DOCUMENTS

| | | | |
|---|---|---|---|
| 4,143,088 | 3/1979 | Favre | 260/825 |
| 4,309,520 | 1/1982 | Blizzard | 525/477 |
| 4,736,048 | 4/1988 | Brown et al. | 556/454 |
| 4,847,400 | 7/1989 | Krahnke et al. | 556/412 |
| 4,962,174 | 10/1990 | Bilgrien et al. | 525/474 |
| 5,079,311 | 1/1992 | Colas | 525/478 |
| 5,082,706 | 1/1992 | Tangney | 428/40 |
| 5,091,484 | 2/1992 | Colas et al. | 525/477 |
| 5,100,976 | 3/1992 | Hamada | 525/477 |
| 5,208,300 | 5/1993 | Krahnke et al. | 525/474 |
| 5,210,156 | 5/1993 | Clark et al. | 525/477 |

FOREIGN PATENT DOCUMENTS

| | | |
|---|---|---|
| 0360516A2 | 9/1989 | European Pat. Off. |
| 0370689A2 | 11/1989 | European Pat. Off. |
| 0378420A2 | 1/1990 | European Pat. Off. |
| 2231728 | 5/1974 | France . |

Primary Examiner—George F. Lesmes
Assistant Examiner—Blaine Copenheaver
Attorney, Agent, or Firm—Alexander Weitz

[57] ABSTRACT

Moisture-curable silicone pressure sensitive adhesives can be covered with an addition-cured fluorosilicone release coating to provide a releasable laminate. The release force of the laminate is low to moderate and the subsequent adhesion and tack of the adhesive is high and all three values are stable with time. The laminate can be prepared by contacting the release coating with solvent-free or solvent-containing adhesive 14 Claims, 2 Drawing Sheets

LAMINATE ARTICLE COMPRISING MOISTURE-CURABLE SILICONE PRESSURE SENSITIVE ADHESIVE AND RELEASE LINER

BACKGROUND OF THE INVENTION

The present invention relates to a peelable laminate comprising a moisture-curable silicone pressure sensitive adhesive (SPSA) releasably adhered to a release liner.

Whether the SPSA has the form of, for example, an adhesive layer on a substrate in the form of a roll of tape; an adhesive layer on an article protected with a peelable backing, such as a decorative trim item to be adhered to an automobile or a structural item to be adhered to a building; or an adhesive film protected on two surfaces by peelable backings, the SPSA must be separated from at least one adjacent surface before it can be used for its intended purpose.

By the term "silicone pressure sensitive adhesive" it is meant an adhesive comprising one or more siloxane components and possessing sufficient tack and cohesive strength so that it can be adhered with mild pressure to a clean stainless steel substrate and then removed therefrom and adhered to the same or another clean substrate. By the term "permanent adhesive" it is meant an adhesive that bonds to a clean substrate and cannot be so removed and thereafter readhered.

Durable structural glazing is currently done with silicone sealants in a multi-step, labor-intensive time-consuming process. Significant improvements in the structural glazing process could be realized if a SPSA were used in place of the silicone sealant in the current process. Unfortunately, standard SPSAs are not completely suitable for structural glazing applications because of their inherent flowability, albeit slow in the recently improved SPSAs, under sustained stress. Under the sustained stress of gravity the heavy glass panel that is currently used in structural glazing, if not further supported, would eventually experience shear failure of a SPSA bond. A SPSA that cures to a nonshearing adhesive having high adhesive strength would be very beneficial in this and other applications.

In co-pending applications for U.S. patent, titled "SOLUTION-STABLE, MOISTURE-CURABLE SILICONE PRESSURE SENSITIVE ADHESIVES" and "STABLE, MOISTURE-CURABLE SILICONE PRESSURE SENSITIVE ADHESIVES", filed on even date herewith and assigned to the assignee of this application, there are disclosed and claimed moisture-curable SPSA compositions. The use of these SPSA composition would be greatly enhanced if it could be protected in thin film form with a release liner. The disclosures of said patents are incorporated herein by reference to fully delineate these SPSA compositions and how to prepare them.

Recently, Brown and Stickles, U.S. Pat. No. 4,736,048, disclosed a fluorosilicone release liner which is siad to be useful for releasing solvent-cast, heat-cured SPSAs with a force of no more than 200 grams per inch.

Tangney, U.S. Ser. No. 276,178, filed on Nov. 23, 1988 now U.S. Pat. No. 5,082,701 and assigned to the assignee of this application disclosed a laminate article comprising a fluorosilicone release liner and an additioncured SPSA.

Brown and Stickles, and Tangney provided examples of laminates comprising peroxide-cured and addition-cured SPSAs which had been solvent-cast and heat-cured in contact with their fluorosilicone liner. However, they did not disclose any examples of a laminate comprising a moisture-cured SPSA.

BRIEF SUMMARY OF THE INVENTION

It is an object of this invention to provide an article of manufacture comprising a moisture-curable SPSA, which experiences an increase in one or more adhesive properties when exposed to moisture, protected by at least one release liner. It is another object of this invention to provide an article which can be used to transfer a film of moisture-curable SPSA to a substrate. It is a further object of this invention to provide a laminate which can be prepared and stored for long periods of time in the absence of moisture and can be used to provide a moisture-curable SPSA film, when desired. It is a preferred object of this invention to provide new laminates which comprise a SPSA film which is suitable for structural glazing applications.

These objects, and others which will become apparent upon considering the following disclosure and appended claims, are obtained by the article of this invention which, briefly stated, comprises a layer of silanol-free, moisture-curable SPSA suitably substituted with silicon-bonded curing radicals which will cure via the curing radicals to a stronger SPSA, and preferably to a permanent adhesive, when exposed to ambient moisture and bearing at least one release liner releasably adhered to at least a portion of said layer.

In a preferred embodiment the present invention the article comprises a layer of moisture-curable SPSA having both of its surfaces completely laminated to fluorosilicone release liners, one liner of which is more easily peeled from SPSA than the other liner.

The laminates of this invention are useful for providing an adhesive surface which will adhere an object to a substrate Without the need for means to hold the object in place while the adhesive cures.

DETAILED DESCRIPTION OF THE INVENTION

The present invention relates to a laminate article of manufacture comprising a layer of moisture-curable silicone pressure sensitive adhesive composition and at least one liner releasably adhered to at least a portion of said layer; said moisture-curable silicone pressure sensitive adhesive comprising a homogeneous mixture of (A) a silanol-free silicone pressure sensitive adhesive component bearing curing radicals having the formula $R_b(OR')_{3-b}SiZ-$ and capping radicals having the formula $R_3SiO-$ wherein Z denotes a divalent radical linking the silicon atom of the curing radical to a silicon atom of the silicone pressure sensitive adhesive component, R denotes a monovalent hydrocarbon radical, R' denotes an alkyl or alkoxyalkyl radical, and the subscript b has a value of 0 or 1; all other silicon-bonded radicals of the silicone pressure sensitive adhesive component being selected from the group consisting of divalent oxygen atoms linking silicon atoms, hydrogen atoms and monovalent hydrocarbon radicals;

(B) an effective amount of a catalyst component to accelerate the reaction of the curing radicals with moisture to form siloxane bonds; and, optionally.

(C) an effective amount a silicon compound bearing a plurality of silicon-bonded alkoxy radicals to improve the shelf life of the adhesive.

The moisture-curable SPSA can be any of the compositions that are disclosed in said patents noted above.

Curing radicals having the formula $R_b(OR')_{3-b}SiZ$- are present in the SPSA component to provide a way to improve one or more physical properties of the SPSA. In the curing radicals R, when present, can be any monovalent hydrocarbon radical having for example from 1 to 10, preferably 1 to 6, carbon atoms, such as lower alkyl radicals exemplified by methyl, ethyl, propyl and isopropyl; alkenyl, such as vinyl; and aryl, such as phenyl. To obtain maximum curing rates for the adhesive compositions it is preferred that the value of subscript b in the curing radical formula is zero; however when b=1, R is preferably the methyl radical.

R' denotes any alkyl or alkoxyalkyl radical preferably having less than 5 carbon atoms such as methyl, ethyl, isopropyl, methoxyethyl or ethoxyethyl, R' is preferably methyl.

Z denotes any divalent radical which durably links the silicon atom of the curing radical to a silicon atom of the SPSA so that (a) the silicon atom of the curing radical is not removed from the SPSA component during moisture-curing of the SPSA and (b) the moisture-curing reaction is not adversely limited. Z has no other known requirements.

Specific examples of suitable curing radicals include, but are not limited to $(MeO)_3SiCH_2CH_2SiMe_2CH_2CH_2SiMe_2O$-, $(MeO)_3SiCH_2CH_2$-, $(MeO)_3SiCH_2CH_2SiMe_2OSiMe_2CH_2CH_2$-$(MeO)_3SiCH_2CH_2SiMe_2O$- and $(MeO)_3SiCH_2CH_2SiMe_2OSiMe_2O$-.

Herein the ethylene radical is sometimes written as $C_2H_4$ to indicate the isomeric mixture of $CH_2CH_2$ and $CH_3CH$ linkages that are obtained when a hydrosilylation reaction between a silicon-bonded vinyl radical and a silicon-bonded hydrogen atom occurs. For example, the formula $(MeO)_3SiC_2H_4SiMe_2O$- is to be construed as encompassing $(MeO)_3SiCH_2CH_2SiMe_2O$- and/or $(MeO)_3SiCH(CH_3)SiMe_2O$-.

Capping radicals are present in the SPSA component to reduce, and preferably eliminate, the silanol content of the component. In the capping radicals R can be any of said monovalent hydrocarbon radical delineated for the curing radicals; however, methyl, vinyl and phenyl are preferred and methyl is most preferred. Specific examples of suitable capping radicals include, but are not limited to, $Me_3SiO$-, $Me_2ViSiO$- and $PhMe_2SiO$-.

Silicon-bonded radicals of the silicone pressure sensitive adhesive component which are not curing radicals or capping radicals having the formulae indicated are selected from divalent oxygen atoms linking silicon atoms and monovalent radicals selected from hydrogen atoms and the hydrocarbon radicals noted above for R.

The SPSA component of the compositions bearing curing and capping radicals can be prepared by introducing the required curing and capping radicals, in any desired sequence, into a preformed SPSA and/or into one or more of the siloxane components of the SPSA, by way of reactive sites, such as silicon-bonded hydroxyl or vinyl radicals, therein.

SPSA compositions which can be used to prepare the SPSA component comprise (1) an organopolysiloxane resin and (2) a polydiorganosiloxane gum. The weight ratio of resin (1) to gum (2) in the SPSAs ranges from 5/95 to 70/30, preferably 40/60 to 60/40. The silicon-bonded radicals of these SPSAs are selected from the group consisting of divalent oxygen atoms linking silicon atoms, hydroxyl radicals, and monovalent hydrocarbon radicals, such as alkyl, aryl, alkenyl, cycloalkyl, cycloalkenyl, aralkyl and alkaryl; and hydrogen atoms.

The organopolysiloxane resin (1) consists essentially of $R^1_3SiO_{\frac{1}{2}}$ siloxane units and $SiO_{4/2}$ siloxane units and can be dissolved, substantially completely, in either a hydrocarbon liquid such as benzene toluene xylene, heptane and the like or in a silicone liquid such as cyclic or linear polydiorganosiloxanes.

In the $R^1_3SiO_{\frac{1}{2}}$ siloxane units $R^1$ denotes a monovalent hydrocarbon radical preferably having less than 20 carbon atoms, and most preferably having from 1 to 10 carbon atoms, a hydroxyl radical or a hydrogen atom.

Examples of suitable hydrocarbon $R^1$ radicals include alkyl radicals, such as methyl, ethyl, propyl, pentyl, octyl, undecyl and octadecyl; alkenyl radicals, such as vinyl, allyl and 5-hexenyl; cycloalphatic radicals, such as cyclohexyl and cyclohexenylethyl; and aryl radicals such as phenyl, tolyl xylyl, benzyl and 2-phenylethyl.

At least one-third, and more preferably substantially all $R^1$ radical, in the formula for component (1) are methyl radicals. Examples of preferred $R^1_3SiO_{\frac{1}{2}}$ siloxane units include $HMe_2SiO_{\frac{1}{2}}$, $Me_3SiO_{\frac{1}{2}}$, $PhMe_2SiO_{\frac{1}{2}}$ and $Me_2ViSiO_{\frac{1}{2}}$ where Me, Ph and Vi denote methyl, phenyl and vinyl.

The mol ratio of the $R^1_3SiO_{\frac{1}{2}}$ siloxane units to $SiO_{4/2}$ siloxane units of component (1) has a value of from 0.5/1 to 1.5/1, preferably from 0.6/1 to 0.9/1. These mol ratios are easily measured by $Si^{29}$ n.m.r. spectroscopy.

Component (1) consisting essentially of $R^1_3SiO_{\frac{1}{2}}$ siloxane units and $SiO_{4/2}$ siloxane units can be prepared by any suitable method. That is to say, it is believed that the organopolysiloxane resin (1) can be prepared by, for example, silane co-hydrolysis methods or silica hydrosol capping methods known in the art. Component (1) is preferably prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310; each incorporated herein to teach how to prepare organopolysiloxane resins which can be reacted to contain curing radicals or which can be used to make SPSAs which can be reacted to contain curing radicals.

Component (2) of the SPSA component to be converted to contain curing radicals is a polydiorganosiloxane gum having the general formula $R^3R^2_2SiO(R^2_2SiO)_nSiR^2_2R^3$. In this formula each $R^2$ denotes a hydrogen atom or a monovalent hydrocarbon radical and each $R^3$ denotes a radical selected from the group consisting of $R^2$ radicals and OH radicals. Examples of $R^2$ radicals include the hydrocarbon radicals delineated above for $R^1$, including preferred species.

At least 50%, and preferably at least 90%, of the $R^2$ radicals of Component (2) are methyl radicals. The methyl radicals can be distributed in any preferred manner in the polydiorganosiloxane.

General and specific examples of polydiorganosiloxanes which are suitable for use as component (2) in the SPSA compositions include hydroxyl-, hydrogen-and hydrocarbonterminated polydiorganosiloxanes, and the polydiorganosiloxanes in the examples disclosed below.

The organopolysiloxane component (2) has a viscosity at 25° C. of from 100,000 centipoise (100 pascal-seconds) to 100,000,000 centipoise (100 kilopascal-seconds) and more. From a consideration of maximum adhesive properties, component (2) is preferably a gum having a viscosity of at least 1,000,000 centipoise at 25° C.

Component (2) can comprise trace amounts of siloxane branching sites, such as $R^2SiO_{3/2}$ units and $SiO_{4/2}$ units, and can be comprised of a single polydiorganosiloxane or a mixture of two or more different polydiorganosiloxanes, if desired. Polydiorganosiloxanes are well known in the organosilicone art and their synthesis needs no delineation herein. Many are commercially available from major silicone manufacturers.

SPSAs having sites of the formula $\equiv$SiOH, herein also denoted as a silanol-functional SPSA. can be any of those known in the art. The disclosures of U.S. Pat. Nos. 2,736,721; 2,814,601; 2,857,356; 3,527,842; 3,528,940; 3,839,075; 3,929,704; 3,983,298; 4,309,520; 4,584,355; 4,591,622; and 4,774,297 are incorporated herein by reference to illustrate silanol-functional SPSAs that can be used to prepare the moisture-curable SPSA component.

A preferred SPSA composition to be used to prepare the SPSA component is a bodied SPSA composition. A bodied SPSA composition can be prepared by heating a solution of a silanol-functional SPSA in a solvent, such as a water-azeotroping hydrocarbon, at reflux until its silanol content has been reduced, preferably to a value of less than one weight percent.

The SPSA component can be prepared by a process wherein an $\equiv$SiX-functional SPSA is reacted with a compound that will convert a desired number of $\equiv$SiX groups in the SPSA to curing radicals having the formula noted above. Any $\equiv$SiOH which are not converted to curing radicals must be capped with $R_3SiO$- radicals to obtain a moisture-curable SPSA which has substantial resistance to gelling when it is stored in the absence of moisture. It should be understood that at least the polydiorganosiloxane gum or the organopolysiloxane resinous portion or the SPSA composition made therefrom must contain a sufficient number of $\equiv$SiX reactive site to accommodate the introduction of the desired number of curing radicals.

Curing radicals having the formula $R_b(OR')_{3-b}SiZ$- can be introduced by any process wherein the Y radical of $R_b(OR')_{3-b}SiY$ reacts with an X radical of an X-substituted SPSA to form a Z radical, as noted above.

In particular the disclosures of Weyenberg. U.S. Pat. No. 3,175,993; Lucas. U.S. Pat. No. 4,599,394; Klosowski and Meddaugh, U.S. Pat. No. 4,772,675; Krahnke and Saam, U.S. Pat. No. 4,847,400; and Bilgrien and Berg. U.S. Pat. No. 4,962,174 are noted for the preparation of the SPSA component bearing silicon-bonded curing radicals having the formula formula $Me_b(MeO)_{3-b}SiC_2H_4SiMe_2(OSiMe_2)_yD$- wherein y has an average value of from 0 to 6, preferably 0 to 1, each both inclusive.

For example, $(MeO)_3SiCH_2CH_2$- radicals and $(MeO)_3SiCH_2CH_2SiMe_2OSiMe_2CH_2CH_2$- radicals can be introduced into a vinyl radical-containing SPSA component with compounds having the formula $(MeO)_3SiH$ and $(MeO)_3SiCH_2CH_2SiMe_2OSiMe_2H$, respectively. In this example Y=H or $CH_2CH_2SiMe_2OSiMe_2H$, respectively, and $X=CH_2=CH$-.

Radicals having the formulae $(MeO)_3SiO$- and $Me(MeO)_2SiO$-can be introduced into a silanol-functional SPSA component with compounds having the formulae $(MeO)_4Si$ and $Me(MeO)_3Si$, respectively. Alternatively, compounds having the formulae $(MeO)_3SiH$ and $Me(MeO)_2SiH$, respectively, can be used. In these examples Y=MeO- or H, respectively, and X=OH.

$(MeO)_3SiCH_2CH_2SiMe_2O$-, $(MeO)_3SiCH_2CH_2SiMe_2OSiMe_2O$- and $(MeO)_3SiCH_2CH_2SiMe_2CH_2CH_2SiMe_2O$- radicals can be introduced into a silanol-functional SPSA component by the use of compounds such as $(MeO)_3SiCH_2CH_2SiMe_2OSiMe_2H$, $(MeO)_3SiCH_2CH_2SiMe_2CH_2CH_2SiMe_2H$ and $(MeO)_3SiCH_2CH_2SiMe_2H$.

Most conveniently, curing radicals having the formula $R_b(OR')_{3-b}SiZ$- are introduced by reacting a silanol-containing SPSA with a moisture-reactive compound having the formula $R_b(OR')_{3-b}SiY$ wherein Y bears a silicon-bonded hydrolyzable radical such as halogen, acyloxy, amino, amido, etc In view of the type of by-products that are produced during the reaction Y preferably bears an amino nitrogen which provides an ammonia by-product.

Silazanes and disilazanes are preferred compounds for introducing the curing radicals into a silanol-functional SPSA, in view of the type of by-products that will produced during the reaction. Examples of silazanes and disilazanes include $(MeO)_3Si(CH_2CH_2SiMe_2)_x(OSiMe_2)_yNH_2$ and $\{(MeO)_3Si(CH_2CH_2SiMe_2)_x(OSiMe_2)_y\}_2NH$, such as $\{(MeO)_3SiCH_2CH_2SiMe_2\}_2NH$. An highly preferred curing radical is $(MeO)_3SiC_2H_4SiMe_2O$- because it can be readily introduced into the SPSA composition by way of a disilazane.

The SPSA component bearing silicon-bonded curing radicals having the formula $R_b(OR')_{3-b}SiZ$- can bear any number of curing radicals; the rate and extent of cure of the SPSA composition, when exposed to moisture, being dependent on the concentration of curing radicals.

It is believed at this time that the SPSA component should contain an average of at least 1 millimol, preferably at least 2 millimols, of curing radicals per 100 parts by weight of SPSA component to obtain a desirable rate of cure. On the other hand it is currently believed that the SPSA component should contain no more than 100, preferably no more than 50, millimols of curing radicals per 100 parts of SPSA component to achieve a desirable adhesive strength. Of course, mols and parts are to be expressed in comparable terms. For example, 5 millimols and 100 parts can be expressed as 5 milligram-mols and 100 gram parts or as 5 millipound-mols and 100 pound parts.

Capping radicals having the formula $R_3SiO$- can be introduced into the SPSA component by any process wherein the Y' radical of $R_3SiY'$ reacts with a silanol radical of a silanol-substituted SPSA to form a siloxane linkage, as noted above. Briefly, these processes comprise the reaction of a compound bearing a silicon-bonded hydrolyzable radical such as amine, amido, silylamine, halogen or acyloxy; or with a silicon-bonded hydrogen atom.

For example, radicals having the formulae $Me_3SiO$- can be introduced into a silanol-functional SPSA component with compounds having the formulae $Me_3SiCl$, $Me_3SiOCOCH_3$, $Me_3SiH$, $Me_3SiN(CH_3)COCH_3$, $(Me_3Si)_2NCOCH_3$, $Me_3SiNH_2$, $(Me_3Si)_2NH$.

In view of the type of by-products that are produced during the reaction Y' preferably bears an amino nitrogen which provides an ammonia by-product, such as with silazanes and disilazanes, such as $Me_3SiNH_2$ and $(Me_3Si)_2NH$. The disclosure of U.S. Pat. No. 3,527,659 is incorporated herein to teach a preferred method for capping silicon-bonded hydroxyl radicals.

The SPSA component can bear any number of capping radicals, provided the number is sufficient to cap a significant number, preferably substantially all, of the silanols in the SPSA component. By a significant number of silanols it is meant a number sufficient to provide improved shelf-stability for the composition. It is currently believed that substantially no silanols should remain unreacted in the SPSA component in order to obtain maximum shelf-life.

A suitable reaction catalyst should be used when introducing curing and capping radicals into the SPSA component. For example, when using a silicon hydride it is desirable to use a platinum group metal catalyst such as platinum or rhodium and its compounds and complexes to accelerate the hydrosilylation reaction. When using a silazane it is desirable to use a strong acid catalyst such as trifluoroacetic acid. When using an alkoxysilane to introduce curing radicals it is desirable to use a titanate catalyst, such as tetrabutyl titanate.

In addition to a SPSA component bearing silicon-bonded curing radicals the adhesive compositions further comprise an effective amount of a catalyst component (B) to accelerate the reaction of the curing radicals with moisture to form siloxane bonds.

Catalysts for accelerating the reaction of the OR' radicals with moisture to form siloxane bonds are well known in the silicone elastomer art and need no detailed delineation herein. Briefly, said catalysts include, but are not limited to, metal salts of monocarboxylic acids, such as stannous octoate, dibutyltin dilaurate and dibutyltin diacetate; titanium esters, such as tetrabutyl titanate, tetraethylhexyl titanate and tetraphenyltitanate; siloxytitanates, such as tetrakis(trimethylsiloxy)titanium and bis(trimethylsiloxy)-bis(isopropoxy)titanium; and betadicarbonyltitanium compounds, such as bis-(acetylacetonyl)diisopropyl titanate; amines, such as hexylamine; and their acetate and quat salts.

Preferred catalyst are bis(acetylacetonyl)diisopropyl titanate and certain orthotitanates, such as tetrabutyl titanate, and their partial hydrolyzates. The amount of titanium-containing catalysts typically ranges from 0.1 to 2%, based on the weight of the SPSA component.

In addition to a SPSA component bearing silicon-bonded curing radicals and an effective amount of a catalyst component (B) to accelerate the reaction of the curing radicals with moisture to form siloxane bonds the adhesive compositions can optionally further comprise (C) an effective amount a silicon compound bearing a plurality of silicon-bonded alkoxy radicals to improve the shelf life of the composition.

Component (C) in the adhesive composition can be any compound bearing two or more, preferably three or more, silicon-bonded alkoxy radicals. Any other silicon-bonded radicals in component (C) are to be selected from the group consisting of divalent oxygen atoms linking silicon atoms, divalent hydrocarbon atoms linking silicon atoms, hydrogen atoms and monovalent hydrocarbon radicals.

The component (C) can be a silane or a partial hydrolyzates and/or condensates thereof. Examples of suitable silanes include di-, tri- and tetra-alkoxy silanes wherein the alkoxy radicals are, for example, methoxy, ethoxy, n-propoxy, i-propoxy and butoxy, each used singularly or in mixtures, and the other silicon-bonded radicals, if present, include hydrogen; monovalent hydrocarbon, such as alkyl, such as methyl, ethyl, propyl; aryl, such as phenyl and benzyl; and olefinic, such as vinyl and allyl; and polyvalent hydrocarbon, such as ethylene and phenylene. Included herein are orthosilicates, such as ethyl orthosilicate and n-propyl orthosilicate; alkyltrialkoxy silanes, such as methyltrimethoxy silane alkylene-bis-trialkoxysilanes, such as bis-trimethoxysilylethane; and polysilicates, such as ethyl polysilicate.

The adhesive composition can be prepared by introducing curing and capping radicals of the formulae noted above into a SPSA component, preferably in solution, and thereafter admixing a suitable amount of the catalyst component (B) and, optionally, a suitable amount a silicon component (C) bearing a plurality of silicon-bonded alkoxy radicals.

The solvent component can be any liquid that will dissolve the SPSA and the curing radical-containing component without adversley reacting therewith in the absence of moisture. Examples of suitable solvents include aromatic hydrocarbons, such as benzene, toluene and xylene; aliphatic hydrocarbons, such as hexane heptane and cyclohexane; halogenated hydrocarbons such as chlorocarbons; oxygenated solvents such as esters, ketones and lower alcohols and volatile siloxanes such as hexamethyldisiloxane and cyclopolydimethylsiloxanes.

The adhesive composition typically, but not necessarily, further comprise an appropriate quantity of a solvent to provide a lower viscosity for, and hence an easier application of, the SPSA composition to various substrates. The amount of solvent is not critical; however, only a sufficient amount to facilitate the preparation, handling and applying of the composition is recommended. The solvent when used, is preferably used in an amount sufficient to provide a viscosity of from 10,000 to 100,000 centipoise at 25° C. for the composition.

Concrete examples of this component are the same as those delineated above for use during the preparation of the SPSA component and mixtures thereof. The solvent, when used, is preferably a non-reactive hydrocarbon solvent or siloxane solvent. It has been found convenient, but not necessary, to prepare the SPSA component in a solvent that can be allowed to remain in the final composition as a viscosity-adjusting solvent.

The adhesive release liner of the laminates of this invention can comprise any suitable material which can be releasably adhered to the moisture-curable adhesive. By "releasably adhered" it is meant that the adhered liner will remain adhered to the adhesive until it is to be removed, and can then be removed so as to expose the adhesive preferably without tearing the adhesive film and/or separating the adhesive film from any other substrate to which it is durably or releasably adhered. By "durably adhered" it is meant that a material, such as an adhesive, a coating or a surface treatment, that is adhered to a substrate will remain adhered to the substrate during the normal use of the material and, if removable, can only be removed from the substrate by damaging the material and/or the substrate.

The adhesive release liner can be any of the liners known in the art for releasing SPSAs. Typically, a release liner comprises a flexible backing having at least one surface thereof treated in some manner to provide a low surface energy for the surface.

For example, the release liner can be a fluorosilicone release liner described by Brown and Stickles or by Tangney, above, both incorporated herein by reference to show how to prepare release liners that are suitable for use in the article of this invention.

Preferably the fluorosilicone release liner comprises a flexible backing having a cured, adhesive-releasing coating durably adhered to at least one surface thereof. The coating comprises the reaction product of components consisting essentially of (D) a fluorosilicone polymer bearing alkenyl radicals; (E) an organohydrogenpolysiloxane free of aliphatic unsaturation having an average of at least 2 silicon-bonded hydrogen atoms in each molecule, and (F) a platinum-containing catalyst in a quantity sufficient to provide 0.1 to 1,000 weight parts platinum for each one million weight parts of the combined quantity of Components (D) and (E).

While the fluorosilicone polymer containing alkenyl radicals can have any linear structure it is preferred that it have the formula, where Vi and Me denote vinyl and methyl, $ViMe_2SiO(Me_2SiO)_p\{R^4QSi(Me)O\}_q(MeViSiO)_rSiMe_2Vi$ wherein the sum of $p+q+r$ has a value of about 1500 and each has value such that the fluorosilicone polymer contains from 0.1 to 1.0 mol percent vinyl-containing siloxane units, at least 30, preferably 30 to 50, mol percent siloxane units bearing $R^4Q$ radicals and the balance dimethylsiloxane units.

Examples of alkenyl radicals include vinyl, allyl, butenyl, pentenyl, hexenyl, octenyl and decenyl. Preferably the aliphatic unsaturation in the alkenyl curing radicals is in the terminal, i.e. omega position.

$R^4$ denotes a perfluoroalkyl radical having from 2 to 8 carbon atoms. Q denotes a divalent hydrocarbon radical linking the $R^4$ radical to a silicon atom by at least 2 carbon atoms.

Examples of $R^4$ include $CF_3$; $C_2F_5$; $C_3F_7$; $C_4F_9$, such as $CF_3CF_2CF_2CF_2$, $(CF_3-)_2CFCF_2$, $(CF_3)_3C$ and $CF_3CF_3(CF_3)CF$; $C_5F_{11}$, such as $CF_3CF_2CF_2CF_2CF_2$; $C_6F_{13}$, such as $CF_3(CF_2)_4CF_2$; $C_7F_{15}$, such as $CF_3(CF_2CF_2)_3$; and $C_8F_{17}$. Examples of suitable Q include $CH_2CH_2CH_2$, $CH_2(CH_3)CH_2$, $(CH_2CH_2)_2$, $CH_2(CH_2)CH_2CH_2$ and $CH(CH_3)CH_2$.

Each fluorinated radical, $R^4Q$, preferably has the formula $R^4CH_2CH_2$ and most preferably the formula $CF_3CF_2CF_2CF_2CH_2CH_2$.

The fluorosilicone polymer (D) can be prepared by any of several method disclosed in the art. For example, organoterminated polymers can be prepared by the method of Pierce et al., U.S. Pat. No. 2,961,425; or by the method of Brown et al., U.S. Pat. No. 4,736,048. The patents to Brown et al. and to Pierce et al. are incorporated herein by reference to show how to prepare fluorosilicone polymers.

Component (E) that is used to prepare the fluorosilicone adhesive-releasing coating is an organohydrogenpolysiloxane having an average of at least 2 silicon-bonded hydrogen atoms in each molecule and functions as a crosslinker for component (D). The curing of the fluorosilicone polymers proceeds by the platinum-catalyzed addition reaction of the silicon-bonded hydrogen atoms in this component with the alkenyl radicals in component (D) under the catalytic activity of component (F).

Component (E) can be any of the currently known organohydrogenpolysiloxanes having an average of at least two, and preferably three or more, silicon-bonded hydrogen atoms per silicon atom. The molecular structure of this component is not critical and can be cyclic, linear, branched and/or network, as desired. The organic radicals in component (E) can be any monovalent hydrocarbon radical free of aliphatic unsaturation, as is well known, such as the general and specific alkyl and aryl radicals denoted above for component (D). For maximum compatibility of components (D) and (E) the organic radicals in each component are preferably the same.

Examples of component (E) include, but are not limited to, organohydrogen silicon compounds bearing a plurality of silicon-bonded hydrogen atoms, such as cyclic, linear and resinous siloxanes; such as methylhydrogencyclopolysiloxanes having the unit formula $MeHSiO_{2/2}$; linear methylhydrogenpolysiloxanes having the formulae $Me_3SiO(MeHSiO)_i(Me_2SiO)_jSiMe_3$ and $HME_2SiO(MeHSiO)_i(Me_2SiO)_jSiMe_2H$ where i and j have values of zero or more; and branches siloxanes such as $(HMe_2SiO)_4Si$. Specific examples of organohydrogenpolysiloxanes that are useful as component (E) include compounds having the formula $Me_3SiO(MeHSiO)_i(Me_2SiO)_jSiMe_3$ wherein i has an average value of at least 3 and j has an average value of 0 or more and compounds having the formula $Me_3SiO(MeHSiO)_iSiMe_3$ wherein i has a value of from 30 to 70.

To improve the compatability of the organohydrogenpolysiloxane (E) with the fluorosilicone polymer (D) it is desirable to have up to half of the organic radicals in (E) be $R^4Q$ radicals, where $R^4$ is preferably the same as it is in (D), and the remaining organic radicals being methyl radicals.

Thus, the fluorosilicone crosslinkers disclosed by Holbrook in U.S. Pat. No. 3,344,160 and by Carter et al. in U.S. Pat. No. 4,057,566, incorporated herein by reference, and organohydrogenpolysiloxanes having the general formulae $Me_3SiO(MeHSiO)_i(MeR^4QSiO)_jSiMe_3$ and $HMe_2SiO(MeHSiO)_i(MeR^4QSiO)_jSiMe_2H$ where i and j have values of zero or more are preferred organohydrogenpolysiloxanes in the fluorosilicone adhesive-releasing composition.

In view of the favorable curing rate that it provides for the coating composition that is used to provide the adhesive-releasing coating of the laminates of this invention an organohydrogenpolysiloxane having the formula $Me_3SiO(MeHSiO)_{28}\{R^4QSi(Me)O\}_{12}SiMe_3$, wherein $R^4Q$ has the formula $CF_3CF_2CF_2CF_2CH_2CH_2$, is a preferred component (E).

Organohydrogenpolysiloxanes bearing $R^4Q$ radicals can be synthesized by well-known methods. In addition to the methods of Holbrook et al. and of Carter et al. the methods noted above for the preparation of fluorosilicone polymer (D) can be used with the proviso that silane and/or siloxane intermediates bearing silicon-bonded hydrogen atoms be included as reactants in the synthesis methods disclosed.

Component (F) that is used in the adhesive-releasing coating is a platinum-containing catalyst which will accelerate the reaction of the alkenyl radicals of component (D) with the crosslinking agent (E), particularly at elevated temperature. Concrete examples here are chloroplatinic acid, chloroplatinic acid-olefin complexes, chloroplatinic acidvinylsiloxane complexes, and platinum supported on a microparticulate carrier such as alumina.

A particularly useful platinum-containing catalyst for the SPSA compositions is the chloroplatinic acid-vinylsiloxane complex disclosed by Willing in U.S. Pat. No. 3,419,593, hereby incorporated by reference. However, the platinum-containing catalyst can be any of the well-known materials that are effective for catalyzing the hydrosilylation reaction of silicon-bonded hydrogen atoms with silicon-bonded alkenyl radicals.

The amount of component (E) to be used in the fluorosilicone adhesive-releasing compositions is merely that amount that will provide from 1 to 40, preferably from 1 to 10, and most preferably from 1 to 7, silicon-bonded hydrogen atoms for every alkenyl radical in the fluorosilicone polymer.

Beyond the need for a complete cure it is usually desirable to use a sufficient amount of a curing catalyst in the adhesive-releasing compositions to provide a rapid cure rate. The exact amount of said catalyst will depend on the particular catalyst that is used and is not easily predicted. However, for chloroplatinic acid and its complexes, an amount sufficient to provide from 0.1 to 1000, preferably 1 to 500, parts by weight of platinum for every one million parts by weight of the fluorosilicone polymer is usually sufficient. Within this range routine experimentation can be used to determine the optimum amount of catalyst needed for any particular cure time.

The adhesive-releasing compositions can further comprise various amounts of optional components that will not adversely limit its use as a coating composition for the release of SPSAs. Examples thereof include reactive components, such as adhesion promoters to improve the bonding of the cured composition to a substrate and catalyst activity attenuators to inhibit the activity of the catalyst at room temperature; and unreactive components such as diluents to decrease the viscosity and/or to increase the coatability of the curable composition.

Preferred diluents include halogenated solvents, such as chlorofluorocarbons; esters, such as ethyl acetate; ketones such as methylisobutyl ketone; ethers, such as dibutyl ether; and aliphatics, such as hexane and heptane.

Preferred catalyst activity attenuators include methylvinylcyclosiloxanes; esters of unsaturated alcohols and/or unsaturated acids, such as diallyl maleate and bis-(2-methoxyisopropyl) maleate; acetylenic compounds, such as methylbutynol; and ene-ynes, such as ethynylcyclohexene. The reader is referred to, for example, the disclosures of U.S. Pat. Nos. 3,445,420; 4,256,870; 4,465,818 and 4,562,096, to further illustrate the optional attenuator component.

The backing that is used to manufacture the liner can be any flexible material such as, for example, polymeric film; such as films of polyester, polyolefin, or polyimide; glass cloth; metal foil; polymeric film-coated metal foil; paper; such as Japanese paper and synthetic paper; textiles; and polymeric film-coated paper.

The laminate of the present invention can comprise any moisture-curable SPSA comprising components (A) to (C), delineated above, adhered to any liner comprising any of the addition-cured, adhesive-releasing coatings consisting essentially of components (D) to (F), also delineated above, durably adhered to any of the backings delineated above.

The preferred liner for the laminates of this invention is to be prepared by coating a backing, preferably a flexible polymeric sheeting, with a chlorofluorocarbon solvent-solution of components consisting essentially of a component (D) having the formula $ViMe_2SiO(Me_2SiO)_p\{R^4QSi(Me)O\}_q(MeViSiO)_rSiMe_2Vi$ wherein the sum of $p+q+r$ has a value of about 1500 and the individual values of p, g and r are each greater than zero and are such that the fluorosilicone polymer contains from 0.1 to 1.0 mol percent alkenyl-containing siloxane units and at least 30 mol percent siloxane units which bear $R^4Q$ radicals where $R^4Q$ has the formula $CF_3CF_2CF_2CF_2CH_2CH_2$; a component (E) having the formula $Me_2SiO(MeHSiO)_{28}\{R^4QSi(Me)O\}_{12}SiMe_3$ wherein $R^4Q$ has the formula $CF_3CF_2CF_2CF_2CH_2CH_2$ and a platinum-containing catalyst.

The laminates of this invention can be prepared by any process which comprises contacting the liner with the SPSA. For example, the laminate can be prepared by a process comprising forming a liner by applying to at least one surface of a backing a coating of a composition comprising a curable adhesive-releasing composition consisting essentially of components (D) to (F); causing the applied curable adhesive-releasing composition to cure; contacting the liner with a layer of a curable pressure sensitive adhesive composition comprising components (A) to (C); and devolatilizing the applied curable pressure sensitive adhesive composition. Alternatively, said liner can be applied to a layer of devolitilized pressure sensitive adhesive comprising components (A) to (C).

If the liner is not initially brought into contact with the SPSA by a surface which bears an adhesive-releasing surface which is the reaction product of components (D) to (F). it is subsequently so-contacted. In other words, the laminate of this invention can be prepared by contacting the liner, by any surface thereof, with the SPSA, cured or uncured, and including contacting the SPSA with the fluorosilicone adhesive-releasing coating.

The laminate of this invention can have any form that comprises a layer of SPSA. as delineated above, and a liner, as delineated above, adhered to at least a portion of said layer of pressure sensitive adhesive.

For example, the laminate can comprise nothing more than said SPSA and said liner. However the laminate of this invention will typically further comprise an additional item adhered to the SPSA. Said additional item can be, for example, a support for the SPSA. durably adhered thereto. Examples of a support include a label; a cured foam, a tape, one side of which serves as the liner of said laminate an hygienic article, a decorative item, etc. Alternatively, said item can be another liner; such as a separate liner identical to, or distinct from, the first liner of the laminate; or another portion of the first liner, such as in a tape form which provides a free adhesive film via differential release of the SPSA from two liners.

The laminate of this invention, whether catalyzed or uncatalyzed, can be stored, for example as a transfer film. in the absence of moisture for extended periods of time without experiencing any substantial loss of adhesive properties. Accordingly, they can be prepared up to several months prior to being exposed to moisture.

Thereafter it is preferred to apply the adhesive-bearing substrate to the surface before the adhesive has experienced a complete loss of tack.

DESCRIPTION OF THE DRAWINGS

The laminate of this invention is illustrated in some of its forms by the accompanying drawings.

Figure 1:
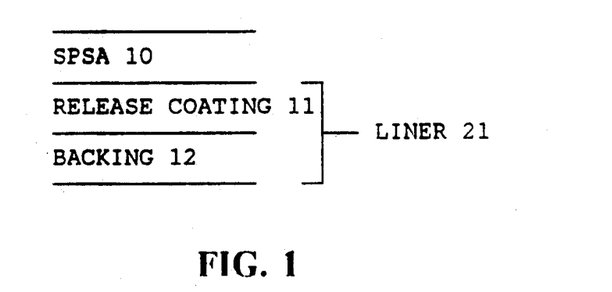
FIG. 1 is a sectional view of a laminate of this invention which comprises a liner (21) made up of a backing (12) bearing a durably adhered release coating (11) which is releasably adhered to a layer of moisture-curable SPSA (10). This laminate can be used to position a layer of SPSA onto a support to provide a laminate illustrated by FIG. 2 or FIG. 4, or onto a second, identical liner to provide a laminate of this invention illustrated by FIG. 3, or onto a second, but different, liner to provide a laminate illustrated of this invention by FIG. 6. Alternatively, the laminate of FIG. 1 can be rolled into a coil form, in such a manner as to durably adhere its exposed SPSA to the surface of the backing that does not contain the adhesive-releasing layer, thereby forming a tape.
Figure 2:
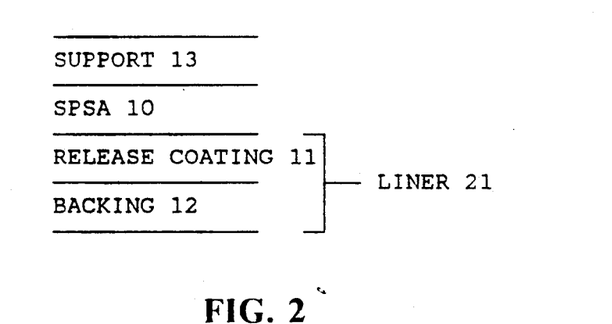
FIG. 2 is a sectional view of a laminate which comprises a liner (21) made up of a backing (12) bearing a durably adhered release coating (11) which is releasably adhered to a layer of moisture-curable SPSA (10) bearing a durably adhered support (13), such as a label, a tape or an emblem.
Figure 3:
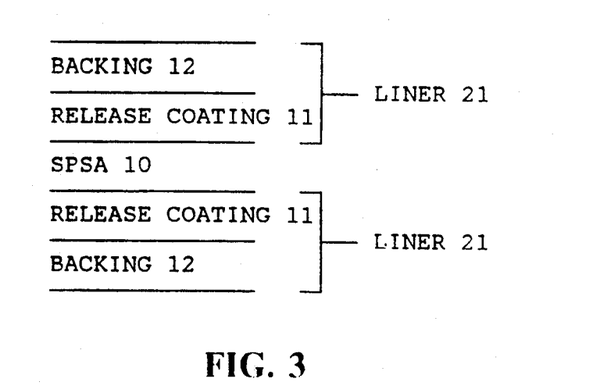
FIG. 3 is a sectional view of a laminate laminate of this invention which comprises two identical liners (21) each made up of a backing (12) bearing a durably adhered release coating (11) which is releasably adhered to a layer of moisture-curable SPSA (10). An example of an item represented by this figure is a sheet or strip laminate for positioning a layer of SPSA onto a surface. Typically, this laminate has the property of differential release wherein the first-removed liner is removable from the SPSA with a force substantially less than the force needed to remove the second-removed liner.
Figure 4:
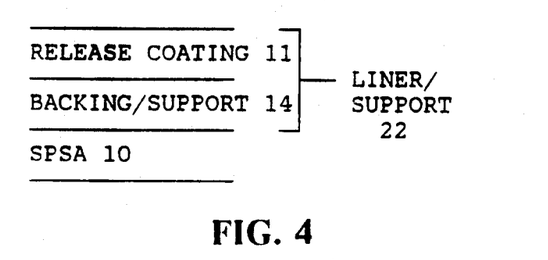
FIG. 4 is a sectional view of a laminate which comprises a liner/support (22), made up of a backing/support (14) bearing a durably adhered release coating (11) and a durably adhered, moisture-curable SPSA. The laminate of FIG. 4 can be rolled into a coil form, in such a manner as to adhere its exposed SPSA to the surface of the backing that contains the adhesive-releasing layer, thereby forming a tape.
Figure 5:
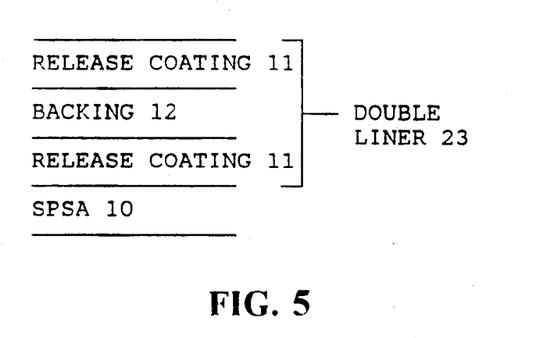
FIG. 5 is a sectional view of a laminate of this invention which comprises a double liner (23) made up of a backing (12) bearing a durably adhered release coating (11) on each side thereof, one coating of which is releasably adhered to a layer of moisture-curable SPSA (10). The laminate of FIG. 5 can be rolled into a coil form in a manner such that the remaining adhesive-releasing coating is brought into releasable contact with the exposed surface of the SPSA of the laminate, thereby forming a source of a layer of free adhesive. As with the laminate of FIG. 3 a laminate illustrated by FIG. 5 typically possesses the property of differential release.
Figure 6:
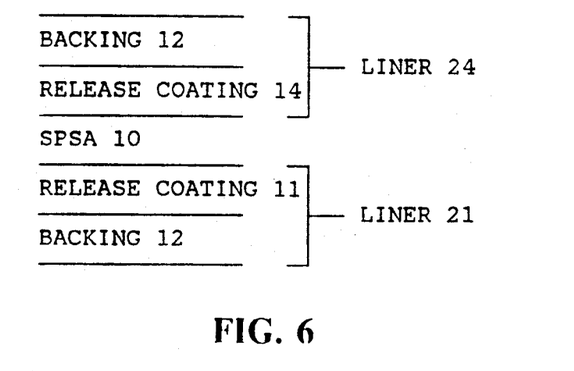
FIG. 6 is a sectional view of a laminate of this invention which comprises a liner (21) made up of a backing (12) bearing a durably adhered release coating (11) which is releasably adhered to a layer of moisture-curable SPSA (10) and a second, but different, liner (24) made up of a backing (12) bearing a durably adhered release coating (14). An example of an item represented by this figure is a sheet or strip laminate for positioning a free layer of SPSA onto a surface. Typically, this laminate has the property of differential release wherein the first-removed liner is removable from the SPSA with a force substantially less than the force needed to remove the second-removed liner.

The following disclosure is to illustrate, but not limit, the present invention, which is properly delineated by the appended claims. Unless stated otherwise, all ratios, parts and percentages are by weight and temperatures are in degrees Celsius.

Preparation of Release Liner

A fluorosilicone adhesive-release coating composition consisting of 10 parts of a vinyldimethylsiloxane-endblocked fluorosilicone polymer having about 1500 silicon atoms per molecule, including 30 mol% $R^4Q(CH_3)SiO_{2/2}$ units, 0.5 mol% $CH_2=CHMeSiO_{2/2}$ units and the balance dimethylsiloxane units; 89.7 parts of trichlorotrifluoroethane; 0.3 part of a complex of divinyltetramethyldisiloxane and $H_2PtCl_6$; a cure-delaying amount of a catalyst inhibitor and a sufficient amount of $Me_3SiO(MeR^4Q)_{12}(MeHSiO)_{28}SiMe_3$ to provide 4 silicon-bonded hydrogen atoms for each silicon-bonded vinyl radical in the composition was coated onto a piece of 2-mil polyester film using a #8 Mayer Rod and the coated film was heated at 302° F. for 24 seconds to cure the coating and to provide a cured coat weight of 0.6 pounds per ream. $R^4Q=C_4F_9C_2H_2$.

Measurement of Peel Adhesion and Tack

Unless otherwise stated, a 50% solution of SPSA was cast onto 2-mil Mylar(R), drawn down with a 3 mil bird bar (Gardner Pacific) and the film was heated at 70° for 3 minutes to remove volatile material and provide a dry adhesive thickness of 1.5 mils.

Peel adhesion (Adh) of a SPSA was measured by applying a 6"×1" strip of the Mylar-backed adhesive to a clean 2"×6" stainless steel panel using two passes of a 2 kg rubber-coated roller. The force required to remove the tape therefrom was measured with a Keil Tester at a peel angle of 180° at a rate of 12 inches/minute. The values recorded are the average of multiple readings taken during the course of one pull per sample. The Keil Tester is described in TAPPI, vol. 43, No. 8, pages 164A and 165A (August, 1960).

Tack was measured on 6-1" squares of the Mylar-backed adhesive using a POLYKEN (R) brand probe tack tester (Testing Machines, Inc.; Amityville, NY). The test procedure used a 20 gram weight, a dwell time of 0.5 seconds and a pull speed of 0.5 cm/sec. and the results are the average of the six readings expressed in units of grams.

Measurement of Tensile Adhesion

Tensile Adhesion (TA) was measured in accordance with ASTM C 1135-90, "Standard Test Method for Determining Tensile Adhesion of Structural Sealants", except as follows, the test specimens were conditioned at 23° C. for 0, 3, 7, 14, 30, 60 and 90 days, in addition to the 21 days required by ASTM C 1135-90; and the test specimens were assembled with an adhesive-bearing core of cured silicone rubber, rather than a solid plug of sealant of the same size which was cured in contact with the glass panels.

Core #1 was one-half of a cured honeycombed extrusion of silicone rubber having a durometer of 70 and dimensions of 1"h ×½"w ×2"l and having 17 cylindrical holes. 3/32" i.d. ×2"l, arranged in three columns of 6, 5 and 6 holes, evenly spaced. The extrusion was cut in half along its width to produce the core having dimensions of ½"h ×½"w ×2"l and having 8 cylindrical holes in the body of the core and 1 semi-cylindrical groove along one non-bonding surface of the core, each having dimensions of 3/32"i.d. ×2"l. The bonding surfaces were adjacent to the groove-bearing surface.

Core #2 has a cured extrusion of silicone rubber having a durometer of 70. and a "cinder block form" cross section with dimensions of ⅜"h ×½"w ×2"l and the 2 rectangular holes having dimensions of ¼"h ×3/32"w ×2"l. The bonding surfaces of the core were the opposing ½" wide surfaces.

The adhesive-bearing cores were prepared by one of two methods, i.e., the Core Coating method or the Transfer Film method.

In the core coating method a solution of SPSA was applied to both bonding surfaces of the core of silicone rubber, at a wet thickness of 10 mils. unless stated otherwise, and devolatilized at 70° C. to provide the adhesive-bearing core. A release liner was applied to the devolatilized SPSA if the tape was to be stored before being used. To assemble the test specimen the release liner, if any, was removed and the adhesive surfaces were adhered to the 1"×3" panels of the test specimen.

In the transfer film method a solution of SPSA was applied to the release liner in a wet thickness of 10 mils. unless stated otherWise, and the applied solution was devolatilized at 70° C. for 5 minutes. A second release liner was applied to the devolatilized adhesive if the transfer film was to be stored before use. To assemble the adhesive-bearing core the second release liner, if any, was removed and the devolatilized SPSA. with its first release liner, was adhered to one bonding surface of the silicone rubber core. The process was repeated on the other bonding surface of the core. To assemble the test specimen the remaining liners were removed from the transferred adhesive and the exposed adhesive surfaces were adhered to the 1"×3" panels of the test specimen.

Preparation of the Laminate

Unless otherwise stated, a 50% solution of SPSA was cast onto a substrate, drawn down with a 3 mil bird bar (Gardner Pacific) and the film was heated at 70° for 3 minutes to remove volatile material and provide a dry adhesive thickness of 1.5 mils. When the substrate is a release liner a cast or wet-laminated article is obtained. The surface of the devolatilized SPSA can be brought into contact with a second release liner to provide a wet- and dry-laminated article. When the substrate is not a release liner the surface of the devolatilized SPSA can be brought into contact with a release liner to provide a dry-laminated article.

Measurement of Wet-Laminated Liner Release

Liner Release (Rel) was determined by cutting into 1 inch wide strips a laminate consisting of SPSA cast onto a 2 mil Mylar-backed fluorosilicone release coating and laminated to 2-mil Mylar backing and pulling the laminate apart at the adhesive/release coating interface at a rate of 12 inches/minute using a Keil Tester, noted above.

Measurement of Dry-Laminated Liner Release

Dry-laminated liner release was determined by cutting into 1 inch wide strips a laminate consisting of a 2 mil Mylar-backed, cured SPSA which had been laminated to a 2 mil Mylar-backed fluorosilicone release coating and pulling the laminate apart at the adhesive/release coating interface at a rate of 12 inches/minute using a Keil Tester, noted above.

Measurement of Subsequent Peel Adhesion and Tack

Subsequent Adhesion (SA) was measured as noted above for peel adhesion, except using an adhesive that had been removed from a fluorosilicone release liner. SA is expressed in units of ounces/inch, oz/in.

Subsequent Tack (ST) was measured as noted above for the measurement of tack, except using an adhesive that had been removed from a fluorosilicone release liner. ST is expressed in units of grams.

Materials

TBT—Tetrabutyl titanate.
HMDZ—Hexamethyldisilazane.
TFAA—Trifluoroacetic acid.
TDIDE—Titanium diisopropoxy-bis(ethylacetoacetate).
SSA2—A reaction product of tetraisopropyl titanate and an equimolar mixture of mono- and di-2-ethylhexyl acid phosphate, available as Tilcom-SSA2 from Tioxide House. London, U.K.
KR238—Adduct of dioctyl hydrogen phosphite and titanium bis(dioctyl)-pyrophosphato-O-ethylenediolato.
ETMDZ(C)—A reaction mixture of 15.6% non-silazane materials comprising 5% starting materials and 10.6% $\{(MeO)_3SiCH_2\}_2$; 79.8% silazane materials comprising 10.6% $(MeO)_3SiC_2H_4SiMe_2NHSiMe_2CH_2\}_2$, 69.2% $\{(MeO)_3SiC_2H_4SiMe_2\}_2NH$; and 4.6% unidentified products; prepared by adding tetramethyldisilazane to a mixture of vinyltrimethoxy silane and chloroplatinic acid complexed with divinyltetramethyldisiloxane.
ETMDZ(F)—Substantially pure $\{(MeO)_3SiC_2H_4SiMe_2\}_2NH$, prepared by fractionating ETMDZ(C).
ETMDZ(D)—A mixture of 11.6% non-silazane materials comprising 1.4% unidentified by-products and 10.2% $\{(MeO)_3SiCH_2\}_2$, and 88.4% silazane materials comprising 1.8% $\{(MeO)_3SiC_2H_4SiMe_2NHSiMe_2CH_2\}_2$ and 86.5% isomers having the formula $\{(MeO)_3SiC_2H_4SiMe_2\}_2NH$; prepared by distilling ETMDZ(C).
Polymer A—An hydroxyl-terminated polydimethylsiloxane gum having a plasticity number of 137-152, as measured by ASTM 926-67, and a viscosity of at least 10,000,000 centipoise at 25°.
Solution A—A xylene solution containing 70% of a soluble organopolysiloxane consisting of $(CH_3)_3SiO_{\frac{1}{2}}$ units and $SiO_{4/2}$ units in a mol ratio of 0.8/1 and having an hydroxyl content of 3.45% and $M_n = 1.963$, $M_v/M_n = 2.57$ as measured by gel-permeation chromatography using Varian TSK 4000+2500 columns at 35° a chloroform mobile phase at 1 mL/m and an IR detector set at 8.5 microns to detect $SiO_2$. Polystyrene standards were used for linear regression calibrations.
Solution B—A SPSA composition having a silicon-bonded hydroxyl content of 0.45% and containing 45% xylene and volatile siloxanes and 55% of a bodied SPSA consisting of 55% of the organopolysiloxane resin of Solution A and 45% of OH-endblocked polydimethylsiloxane gum having a plasticity of about 60.

EXAMPLES 1-10 AND 1*-10*

Under a dry nitrogen sweep appropriate amounts (listed in Table I) of ETMDZ(D). except ETMDZ(F) for Examples 7 and 8. and TFAA were dissolved in Solution B and the solutions were heated at 100° for about one hour to convert the percentage of SPSA silanols indicated in Table I to curing radicals having the formula $(MeO)_3SiC_2H_4Si(Me)_2O-$. Additionally, the reaction mixtures of Examples 2. 4 and 6 were cooled to 60° and 1 mol of HMDZ per mol of SiOH originally present in Solution B was added and the reaction mixtures were heated at 100° for an additional hour to convert any remaining silanols of the adhesive to trimethylsiloxy capping radicals.

The resulting compositions containing approximately 40-50% solvent were catalyzed with 1% TBT. based on solution weight, and the catalyzed compositions were tested for tack, peel adhesion, liner release and tensile adhesion properties in accordance with the methods described above. The uncatalyzed compositions also were tested for tack, peel adhesion, liner release. The results have been summarized in Tables I and II. Core #1 was used to obtain the tensile adhesion data. Release was wet-laminated release.

Table I shows that the laminates of this invention, whether prepared with catalyzed or uncatalyzed SPSA and having various amounts of curing radicals and silanol content, possess a zero-day release value of 50 grams/inch or less, a value which is not exceeded for at least 21 days for the preferred laminates of this invention which comprise a moisture-curable adhesive which has been fully reacted with ETMDZ and HMDZ, and excellent tack and adhesion retention.

Table II shows that the laminates of this invention provide adhesive transfer films which have tensile adhesion strengths which are comparable to those of moisture-cured adhesives which have been coated directly. These laminates are useful for transferring the adhesive film to, for example, a tape core for structural glazing.

The resulting compositions containing approximately 45-50% solvent were catalyzed with 1% TBT, based on solids, and the catalyzed compositions were tested for tack, peel adhesion, liner release and tensile adhesion properties in accordance with the methods described above. Core #1 was used to obtain the tensile adhesion data. Release was wet-laminated release. The results have been summarized in Tables III and IV.

Table III shows that the laminates of this invention possess release values of less than 50 grams/inch and undiminished tack and adhesion.

Table IV shows that the laminates of this invention provide adhesive transfer films which have tensile-adhesion strengths which are comparable to those of moisture-cured adhesives which have not been in contact with a release liner. These adhesives are useful as a structural glazing adhesive when applied either directly to the tape core or transferred to the tape core as an adhesive film.

TABLE I

| Ex | % OH Conv | Silazane, g. ETMDZ | HMDZ | ← 0 Days → Tack | Ad | ST | SA | Rel | ← 21 Days → Tack | Ad | ST | SA | Rel |
|---|---|---|---|---|---|---|---|---|---|---|---|---|---|
| 1 | 20 | 0.917 | — | 929 | 47 | 895 | 44 | 30 | 647 | 49 | 341 | 31 | 180 |
| 2 | 20 | 0.920 | 8.61 | 1200 | 49 | 1099 | 43 | 5 | 641 | 52 | 812 | 42 | 50 |
| 3 | 40 | 1.839 | — | 336 | 39 | 430 | 39 | 20 | 25 | 26 | 231 | 31 | 50 |
| 4 | 40 | 1.837 | 8.56 | 663 | 20 | 686 | 24 | 0 | 278 | 33 | 469 | 31 | 30 |
| 5 | 50 | 2.298 | — | 248 | 2 | 371 | 6 | 0 | 0 | 1 | 44 | 23 | 45 |
| 6 | 50 | 2.298 | 8.51 | 685 | 20 | 728 | 26 | 0 | 230 | 16 | 487 | 42 | 35 |
| 7 | 70 | 2.653 | — | 378 | 44 | 816 | 44 | 20 | 28 | 3 | 210 | 2 | 100 |
| 8 | 90 | 3.414 | — | 280 | 44 | 618 | 48 | 20 | 14 | 1 | 99 | 5 | 175 |
| 9 | 110 | 5.053 | — | 310 | 37 | 547 | 41 | 15 | 0 | 1 | 71 | 1 | 95 |
| 10 | 150 | 6.894 | — | 462 | 39 | 454 | 49 | 25 | 0 | 1 | 50 | 2 | 55 |
| 1* | 20 | 0.917 | — | 1097 | 35 | 1113 | 36 | 20 | 633 | 51 | 769 | 46 | 25 |
| 2* | 20 | 0.920 | 8.61 | 1170 | 45 | 1166 | 39 | 25 | 807 | 58 | 500 | 46 | 35 |
| 3* | 40 | 1.839 | — | 1092 | 38 | 957 | 37 | 20 | 663 | 50 | 436 | 26 | 160 |
| 4* | 40 | 1.837 | 8.56 | 1013 | 29 | 967 | 30 | 20 | 306 | 47 | 726 | 45 | 25 |
| 5* | 50 | 2.298 | — | 803 | 21 | 947 | 27 | 20 | 360 | 30 | 82 | 7 | 280 |
| 6* | 50 | 2.298 | 8.51 | 982 | 34 | 1068 | 30 | 25 | 303 | 42 | 506 | 45 | 30 |
| 7* | 70 | 2.653 | — | 1065 | 42 | 1000 | 52 | 20 | 724 | 56 | 946 | 62 | 30 |
| 8* | 90 | 3.414 | — | 1105 | 43 | 1025 | 41 | 15 | 751 | 44 | 545 | 20 | 135 |
| 9* | 110 | 5.053 | — | 930 | 44 | 1038 | 46 | 15 | 137 | 5 | 703 | 43 | 45 |
| 10* | 150 | 6.894 | — | 959 | 40 | 953 | 44 | 15 | 335 | 20 | 736 | 49 | 25 |

*Composition not catalyzed.

TABLE II

| Ex | 0 Days TA, psi | 3 Days TA, psi | 7 Days TA, psi | 14 Days TA, psi | Comments |
|---|---|---|---|---|---|
| 1 | 71.8 | 84.7 | 105.0 | 96.9 | Core coating |
| 1 | 71.0 | — | 78.6 | 90.4 | Transfer film |
| 2 | 48.8 | 62.2 | 74.1 | 74.1 | Core coating |
| 2 | 54.0 | 67.4 | 74.3 | 63.2 | Transfer film |
| 4 | 67.3 | 88.0 | 101.9 | 113.0 | Core coating |
| 4 | 80.1 | 65.6 | 78.5 | 90.9 | Transfer film |
| 10 | 63.2 | 116.4 | 116.7 | 93.1 | Core coating |
| 10 | 106.7 | 119.6 | 119.1 | 126.0 | Transfer film |

EXAMPLES 11-15

Solution A and Polymer A were mixed in five different ratios and the five mixtures were heated for 5 hours at water-azeotrope reflux and then cooled to 80°-100°, whereupon 8.15% of ETMDZ(C) and 0.36% of TFAA, each amount based on adhesive solids, were added to convert 60% of the adhesive silanols to curing radicals and the mixtures were heated at 100° for 1 hour. The reaction mixtures were again cooled to 80°-100° and 6.9%, based on solids, of HMDZ was added to cap the remaining adhesive silanols and the mixtures again heated at 100° for 1 hour.

TABLE III

| Ex | R/P | Initial Properties Tack | Adh | Rel | ST | SA |
|---|---|---|---|---|---|---|
| 11 | 50/50 | 732 | 46 | 40 | 823 | 46 |
| 12 | 52/47 | 422 | 43 | 25 | 729 | 49 |
| 13 | 55/45 | 562 | 45 | 30 | 643 | 49 |
| 14 | 57/42 | 643 | 43 | 25 | 735 | 48 |
| 15 | 60/40 | 578 | 38 | 25 | 806 | 47 |

TABLE IV

| Ex | 0 Days TA, psi | 3 Days TA, psi | 7 Days TA, psi | 14 Days TA, psi | Comments |
|---|---|---|---|---|---|
| 13 | 60.8 | 149.4 | 142.3 | 143.4 | Core coating |
| 13 | 82.0 | 118.3 | 102.4 | 122.6 | Transfer film |
| 15 | 94.8 | 121.3 | 115.0 | 118.8 | Core coating |
| 15 | 62.0 | 101.4 | 128.4 | 100.5 | Transfer film |

EXAMPLES 16-28

A solution of 29 parts of xylene, 40 parts Solution A and 23 parts of Polymer A was bodied for 5 hours at 140° and then cooled to 70°. whereupon 4.4 parts of ETMDZ(C) and 0.2 parts of TFAA were added and the mixture was heated at 100° for 1 hour. The reaction mixture was again cooled to 70° and 3.5 parts of HMDZ was added and the mixture again heated at 100° for 1 hour.

strated excellent initial 0-day tensile adhesion which increased over a 28-day exposure to ambient moisture.

TABLE V

| | Catalyst | | | | TA, psi after Tape Aging | | | |
| | | | | | 0 Day Cure | | 3 Day Cure | |
| Ex | Type* | Amnt. | R** | ST** | 0 mo. | 2 mo. | 0 mo. | 2 mo. |
|---|---|---|---|---|---|---|---|---|
| 16 | KR238 | 1.000 | m | m | 88 | 110 | 85 | 170 |
| 17 | KR238 | 0.500 | m | m | 100 | 86 | 98 | 151 |
| 18 | KR238 | 0.250 | g | g | 96 | 97 | 100 | 136 |
| 19 | TBT | 1.000 | g | m | 99 | — | 124 | — |
| 20 | TBT | 0.500 | m | m | 70 | 118 | 90 | 112 |
| 21 | TBT | 0.250 | m | m | 60 | 97 | 118 | 160 |
| 22 | TBT | 0.125 | g | g | 74 | 98 | 109 | 123 |
| 23 | SSA2 | 1.000 | — | — | 95 | — | 155 | — |
| 24 | SSA2 | 0.500 | m | m | 75 | — | 110 | 160 |
| 25 | SSA2 | 0.250 | g | g | 65 | 80 | 105 | 127 |
| 26 | SSA2 | 0.190 | — | — | 70 | — | — | — |
| 27 | SSA2 | 0.096 | — | — | 74 | — | — | — |
| 28 | TDIDE | 0.200 | g | g | 88 | 111 | 103 | 166 |

*See Materials section above for type meanings.
**R = Release; ST = Subsequent tack.
g = good; m = moderate.

Thirteen 100-part portions of the resulting base composition containing approximately 40% solvent were each mixed with 3.64 parts of n-propylorthosilicate and catalyzed with TBT, KR238, SSA2, or TDIDE to provide 13 compositions as noted in Table V. The catalyzed compositions were cast onto a release liner at a wet thickness of 20 mils and devolatilized.

Half of the laminate was cut into ½"-wide strips and the strips immediately used to transferred adhesive to both bonding sides of four pieces of Core #2 to provide double-sided tapes. The double-sided tapes, with liner in place, were stored in the absence of moisture for 2 months at room temperature. The aged tapes were freed of their liners and then tested for tensile adhesion, as described above, using glass panels. The initial-release from the liner and the subsequent tack of the adhesive were noted as the test specimens were being prepared. The results have been summarized in Table V. Adhesive failure from the glass was obtained in each case.

Half of the laminate was covered with another release liner and was stored in the absence of moisture for 6 or 8 months at room temperature. The aged laminate was cut into ½"-wide strips and the strips were then immediately used to prepare double-sided tapes, as noted above, and the tapes were immediately tested for tensile adhesion, as described above, using glass panels. The aged release from the liner and wet-out on glass of the adhesive were noted when the test specimens were being prepared. The results have been summarized in Table VI.

EXAMPLES 29–32

Examples 20–22 and 28 were duplicated except 3.78 parts of bis-(trimethoxysilyl)ethane was used in place of the 3.64 parts of n-propylorthosilicate to provide the compositions of Examples 29–32, repectively. The four compositions were coated onto release liner to make adhesive transfer films laminates which were stored in the absence of moisture for 6 months at room temperature. The aged adhesive transfer film laminates were then used to prepare double-sided tapes, as noted above, and the tapes were immediately tested for tensile adhesion, as described above, using glass panels. The release and wet-out of the adhesive were noted before the test specimens were prepared. The results have been summarized in Table VI. All laminates of this invention provided release transfer adhesive films which demon-

TABLE VI

| | Catalyst | | | | TA, psi after 6 or 8 Months Adhesive Aging | |
| | | | | | 0 Day Cure | 3 Day Cure |
| Ex | Type* | Amnt. | R** | WO** | Months/psi | Months/psi |
|---|---|---|---|---|---|---|
| 17 | KR238 | 0.500 | g | e | 8/87 | 8/107 |
| 20 | TBT | 0.500 | g | g | 6/90 | 6/115 |
| 21 | TBT | 0.250 | s | g | 6/93 | 6/100 |
| 22 | TBT | 0.125 | s | g | 6/80 | 6/110 |
| 23 | SSA2 | 1.000 | e | g | 8/107 | 8/155 |
| 24 | SSA2 | 0.500 | e | e | 8/118 | 8/151 |
| 25 | SSA2 | 0.250 | g | e | 8/102 | 8/125 |
| 28 | TDIDE | 0.200 | g | g | 6/75 | 6/92 |
| 29 | TBT | 0.500 | g | g | 6/90 | 6/115 |
| 30 | TBT | 0.250 | s | g | 6/80 | — |
| 31 | TBT | 0.125 | s | g | 6/89 | 6/110 |
| 32 | TDIDE | 0.200 | g | g | 6/74 | 6/96 |

*See Materials section above for type meanings.
**R = Release; WO = Wet-out.
e = excellent; g = good; s = spotty.

That which is claimed is:

1. As an article of manufacture a laminate comprising a layer of moisture-curable silicone pressure sensitive adhesive composition and at least one liner releasably adhered to at least a portion of said layer; said moisture-curable silicone pressure sensitive adhesive comprising a homogeneous mixture of (A) a silanol-free silicone pressure sensitive adhesive component selected from the group consisting of a mixture of an organopolysilioxane resin with a polydiorganosiloxane gum and a bodied product thereof wherein at least one of said organopolysilioxane resin, said polydiorganosiloxane gum or said bodied product bears curing radicals having the formula $R_b(OR')_{3-b}SiZ$-and capping radicals having the formula $R_3SiO$-wherein Z denotes a divalent radical linking the silicon atom of the curing radical to a silicon atom of the silicone pressure sensitive adhesive component, R denotes a monovalent hydrocarbon radical, R' denotes an alkyl or alkoxyalkyl radical, and the subscript b has a value of 0 or 1; all other silicon-bonded radicals of the silicone pressure sensitive adhesive component being selected from the group consisting of divalent oxygen atoms linking silicon atoms, hydrogen atoms and monovalent hydrocarbon radicals;

(B) an effective amount of a catalyst component to accelerate the reaction of the curing radicals with moisture to form siloxane bonds; and, optionally, (C) an effective amount of a silicon compound bearing a plurality of silicon-bonded alkoxy radicals to improve the shelf life of the adhesive.

2. An article according to claim 1 wherein said liner comprises a backing bearing an adhesive-releasing coating durably adhered thereto which is the reaction product of components consisting essentially of (D) a fluorosilicone polymer bearing alkenyl radicals;

(E) an organohydrogenpolysiloxane frame of aliphatic unsaturation having an average of at least 2 silicon-bonded hydrogen atoms in each molecule, in a quantity sufficient to provide from 1 to 40 silicon-bonded hydrogen atoms per alkenyl radical in Component (D). and (F) a platinum-containing catalyst in a quantity sufficient to provide 0.1 to 1,000 weight parts platinum for each one million weight parts of the combined quantity of Components (D) and (E).

3. An article in accordance with claim 2 wherein component (A) comprises (1) 40 to 60 parts by weight of an organopolysilioxane resinous portion comprising $Me_3SiO_{\frac{1}{2}}$ siloxane units and $SiO_{4/2}$ siloxane units, wherein the mol ratio of the $Me_3SiO_{\frac{1}{2}}$ siloxane units to $SiO_{4/2}$ siloxane units has a value of from 0.6/1 to 0.9/1 and (2) 40 to 60 parts by weight of a polydimethylsiloxane gum having a viscosity at 25° C. of at least 1,000,000 centipoise; said curing radicals have the formula $(MeO)_3SiC_2H_4SiMe_2O-$. wherein Me denotes methyl; said capping radicals have the formula $Me_3SiO-$; component (B) is a titanate; component (D) contains from 0.1 to 1.0 mol percent alkenyl-containing siloxane units and at least 30 mol percent siloxane units which bear $R^4Q$ radicals, and the organic radicals of component (E) are selected from the radical consisting of $CH_2$ radicals and $R^4Q$ radicals wherein $R^4$ denotes a perfluoroalkyl radical having from 2 to 8 carbon atoms and Q denotes a divalent hydrocarbon radical linking the $R^4$ radical to a silicon atom by at least 2 carbon atoms.

4. An article in accordance with claim 3 wherein the component (B) comprises tetrabutyl titanate or titanium diisopropoxy-bis-(ethylacetoacetate); component (C) is n-propyl orthosilicate; component (D) has the formula $ViMe_2SiO(Me_2SiO)_p\{R^4QSi(Me)O\}_q(MeViSiO)_r$-$SiMe_2Vi$ wherein Me denotes methyl, Vi denotes vinyl, $R^4Q$ has the formula $CF_3CF_2CF_2CF_2CH_2CH_2$ and the sum of $p+q+r$ has a value of about 1500; and Component (E) has the formula $Me_3SiO(Me_2SiO)_{28}\{R^4QSi(Me)O\}_{12}SiMe_3$ wherein $R^4Q$ has the formula $CF_3CF_2CF_2CF_2CH_2CH_2$.

5. An article in accordance with claim 4 bearing from 2 to 50 millimols of curing radicals per 100 parts by weight of the silicone pressure sensitive adhesive component.

6. An article according to claim 1 comprising at least two liners adhered to at least two portions of said layer of silicone pressure sensitive adhesive.

7. An article according to claim 6 comprising at least two liners adhered to at least two portions of said layer of silicone pressure sensitive adhesive, one liner being more easily removed from the adhesive than the other liner.

8. An article according to claim 6 consisting of a layer of moisture-curable silicone pressure sensitive adhesive and one or more release liners adhered to the surfaces of said layer of silicone pressure sensitive adhesive.

9. An article according to claim 8 consisting of at least two release liners adhered to said layer of silicone pressure sensitive adhesive one liner being more easily removed from the adhesive than the other liner.

10. An article in accordance with claim 1 wherein the silanol-free silicone pressure sensitive adhesive component (A) bearing curing radicals has been prepared by a method comprising reacting (i) a silicone pressure sensitive adhesive composition having reactive sites of the formula $\equiv SiX$ and X denotes a vinyl radical or a hydroxyl radical, at least one X being OH, with (ii) a moisture-reactive compound having the formula $R_b(OR')_{3-b}SiY$ wherein Y denotes a radical which is reactive with $\equiv SiX$, whereby the Y-substituted silicon atom is linked with the X-substituted silicon atom by a divalent Z radical, R denotes a monovalent hydrocarbon radical, R' denotes an alkyl or alkoxyalkyl radical, and the subscript b has a value of 0 or 1; and with (iii) a silanol-capping compound having the formula $R_3SiY'$ wherein Y' denotes a radical which is reactive with silanol, whereby the Y'-substituted silicon atom is linked with the silanol-substituted silicon atom by a divalent oxygen atom, and R denotes a monovalent hydrocarbon radical; all other silicon-bonded radicals in (i) being selected from the group consisting of divalent oxygen atoms linking silicon atoms, hydrogen atoms and monovalent hydrocarbon radicals.

11. An article in accordance with claim 10 wherein the silicone pressure sensitive adhesive component is prepared by bodying a mixture of (1) 40 to 60 parts by weight of an organopolysilioxane resinous portion comprising $Me_3SiO_{\frac{1}{2}}$ siloxane units and $SiO_{4/2}$ siloxane units, wherein the mol ratio of the $Me_3SiO_{\frac{1}{2}}$ siloxane units to $SiO_{4/2}$ siloxane units has a value of from 0.6/1 to 0.9/1 and (2) 40 to 60 parts by weight of a polydimethylsiloxane gum having a viscosity at 25° C. of at least 1,000,000 centipoise; substantially all X radical are hydroxyl, the moisture-reactive compound and the silanol-capping compound comprise disilazanes and said reacting is promoted by the action of an acid catalyst.

12. An article in accordance with claim 11 wherein the moisture-reactive compound comprises $\{(MeO)_3SiC_2H_4SiMe_2\}_2NH$, prepared by adding tetramethyldisilazane to a mixture of vinyltrimethoxy silane and chloroplatinic acid complexed with divinyltetramethyldisiloxane and allowing a hydrosilylation reaction to occur; the silanol-capping compound has the formula $(Me_3Si)_2NH$ and Me denotes the methyl radical.

13. An article in accordance with claim 12 wherein the amount of moisture-reactive compound is sufficient to react with from 2 to 50 millimols of said silicon-bonded hydroxyl radicals in every 100 parts by weight of silicone pressure sensitive adhesive composition having reactive sites.

14. An article in accordance with claim 13 wherein a solvent component for component (i) is used during said reacting.

* * * * *